United States Patent
Hageneder

(10) Patent No.: US 12,006,904 B2
(45) Date of Patent: Jun. 11, 2024

(54) SPARK-IGNITED RECIPROCATING-PISTON INTERNAL-COMBUSTION ENGINE WITH A PRE-CHAMBER IGNITION SYSTEM

(71) Applicant: Bayerische Motoren Werke Aktiengesellschaft, Munich (DE)

(72) Inventor: Ludwig Hageneder, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/802,858

(22) PCT Filed: Mar. 17, 2021

(86) PCT No.: PCT/EP2021/056752
§ 371 (c)(1),
(2) Date: Aug. 26, 2022

(87) PCT Pub. No.: WO2021/209215
PCT Pub. Date: Oct. 21, 2021

(65) Prior Publication Data
US 2023/0103567 A1 Apr. 6, 2023

(30) Foreign Application Priority Data
Apr. 16, 2020 (DE) .................. 10 2020 110 395.6

(51) Int. Cl.
*F02P 13/00* (2006.01)
*F02B 19/12* (2006.01)
(Continued)

(52) U.S. Cl.
CPC .............. *F02P 13/00* (2013.01); *F02B 19/12* (2013.01); *F02B 19/18* (2013.01); *H01T 13/16* (2013.01)

(58) Field of Classification Search
CPC .......... F02P 13/00; F02B 19/12; F02B 19/18; H01T 13/16; H01T 13/32; H01T 13/39; H01T 13/54; Y02T 10/12
See application file for complete search history.

(56) References Cited

U.S. PATENT DOCUMENTS

| 2,487,535 A | 11/1949 | Fernandez |
| 8,839,762 B1 * | 9/2014 | Chiera ................. F02B 19/12 123/266 |

(Continued)

FOREIGN PATENT DOCUMENTS

| CN | 101779350 A | 7/2010 |
| CN | 102656760 A | 9/2012 |

(Continued)

OTHER PUBLICATIONS

International Search Report (PCT/ISA/210) issued in PCT Application No. PCT/EP2021/056752 dated Jun. 16, 2021 with English translation (five (5) pages).

(Continued)

*Primary Examiner* — Phutthiwat Wongwian
*Assistant Examiner* — Sherman D Manley
(74) *Attorney, Agent, or Firm* — Crowell & Moring LLP

(57) ABSTRACT

A spark-ignited reciprocating piston internal combustion engine may include a pre-chamber ignition system which is arranged in the cylinder head of the reciprocating piston internal combustion engine and in which an ignition device is arranged, comprising an ignition electrode in a housing, said ignition electrode protruding into a cavity of the pre-chamber ignition system. The cavity is covered from the combustion chamber of the reciprocating piston internal combustion engine by a cover, and the cover has at least one first opening which connects the cavity and the combustion chamber together so as to conduct gas. A metal transverse brace with at least one second opening, which connects (Continued)

opposite sides of the housing together, is arranged in the cavity in the region of the ignition electrode, wherein the metal transverse brace is made of a first metal material in a central region and a second metal material in a region contacting the housing.

18 Claims, 1 Drawing Sheet

(51) Int. Cl.
*F02B 19/18* (2006.01)
*H01T 13/16* (2006.01)

(56) References Cited

U.S. PATENT DOCUMENTS

| | | | | |
|---|---|---|---|---|
| 9,476,347 | B2* | 10/2016 | Chiera | F02P 13/00 |
| 11,522,346 | B2* | 12/2022 | Cress | F02B 19/08 |
| 2007/0069617 | A1* | 3/2007 | Tozzi | F02B 19/12 |
| | | | | 313/140 |
| 2009/0309475 | A1* | 12/2009 | Tozzi | H01T 13/54 |
| | | | | 313/143 |
| 2010/0001626 | A1 | 1/2010 | Maul et al. | |
| 2011/0062850 | A1* | 3/2011 | Tozzi | H01T 13/54 |
| | | | | 313/292 |
| 2011/0127900 | A1 | 6/2011 | Ma et al. | |
| 2011/0148274 | A1* | 6/2011 | Ernst | H01T 13/467 |
| | | | | 313/141 |
| 2012/0125279 | A1* | 5/2012 | Hampson | H01T 13/54 |
| | | | | 445/7 |
| 2012/0125287 | A1* | 5/2012 | Chiera | F02P 15/001 |
| | | | | 123/266 |
| 2013/0099653 | A1* | 4/2013 | Ernst | H01T 13/32 |
| | | | | 313/140 |
| 2015/0114332 | A1 | 4/2015 | Stifel et al. | |
| 2016/0254650 | A1* | 9/2016 | Maul | H01T 13/54 |
| | | | | 123/169 EL |
| 2017/0104316 | A1* | 4/2017 | Niessner | H01T 13/54 |
| 2017/0358906 | A1* | 12/2017 | Kuhnert | H01T 13/54 |
| 2018/0123324 | A1 | 5/2018 | Niessner et al. | |
| 2019/0376441 | A1* | 12/2019 | Brubaker | F02P 13/00 |
| 2020/0006925 | A1 | 1/2020 | Shigenaga et al. | |

FOREIGN PATENT DOCUMENTS

| | | |
|---|---|---|
| DE | 10 2012 102 731 A1 | 7/2013 |
| DE | 10 2014 004 943 A1 | 2/2015 |
| DE | 10 2014 111 897 A1 | 4/2015 |
| DE | 10 2015 204 814 B3 | 5/2016 |
| DE | 10 2016 206 992 A1 | 10/2017 |
| DE | 10 2016 120 984 A1 | 5/2018 |
| DE | 10 2018 206 784 A1 | 11/2019 |
| DE | 10 2019 115 735 A1 | 1/2020 |
| DE | 10 2020 105 924 A1 | 9/2021 |
| WO | WO 2008/031482 A1 | 3/2008 |
| WO | WO 2008/157532 A2 | 12/2008 |
| WO | WO 2019/242930 A1 | 12/2019 |

OTHER PUBLICATIONS

German-language Written Opinion (PCT/ISA/237) issued in PCT Application No. PCT/EP2021/056752 dated Jun. 16, 2021 (four (4) pages).
German-language Search Report issued in German Application No. 10 2020 110 395.6 dated Dec. 3, 2020 with partial English translation (13 pages).
Chinese-language Office Action issued in Chinese Application No. 202180013718.2 dated Oct. 27, 2023 with English translation (17 pages).

* cited by examiner

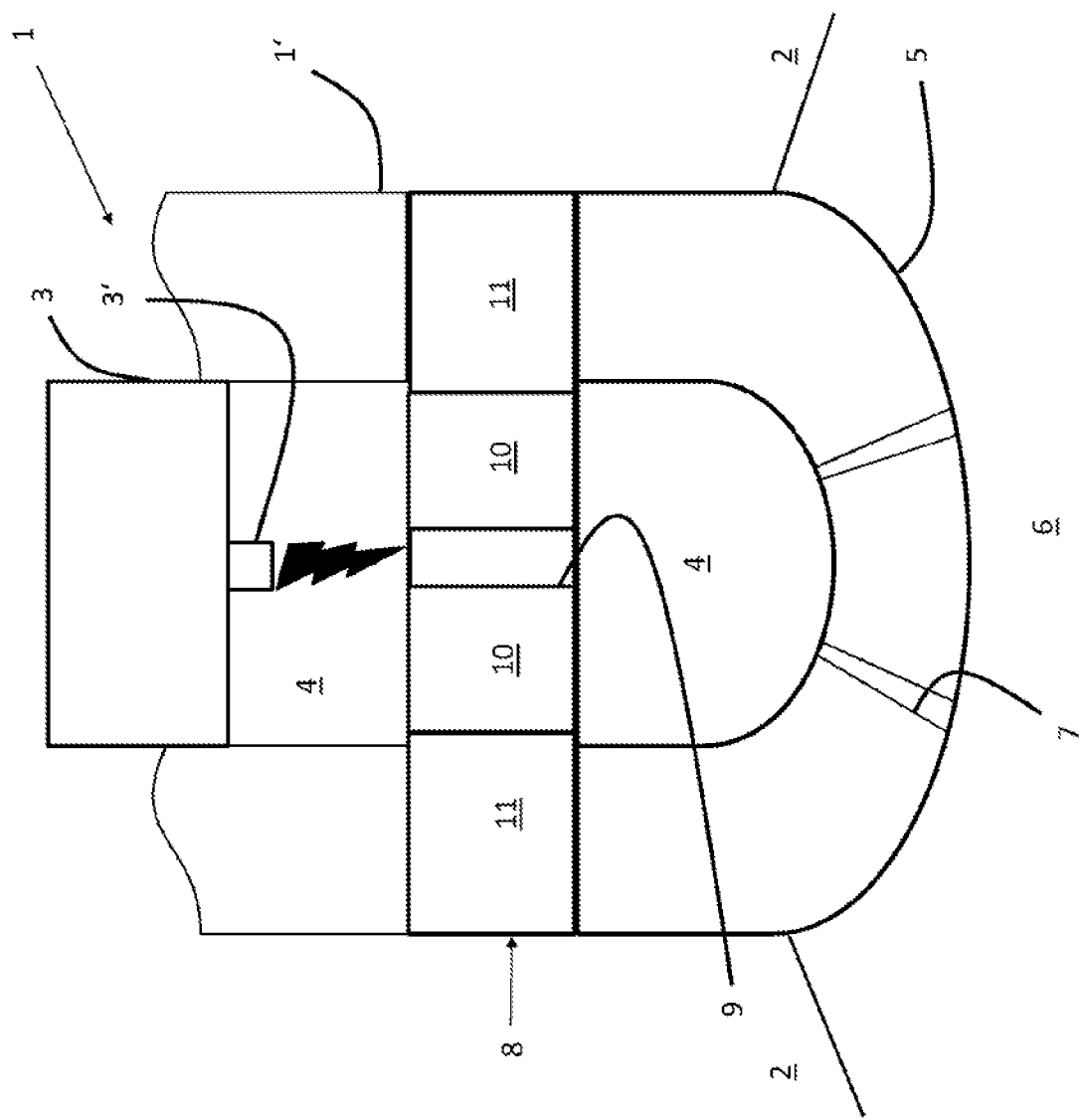

SPARK-IGNITED RECIPROCATING-PISTON INTERNAL-COMBUSTION ENGINE WITH A PRE-CHAMBER IGNITION SYSTEM

BACKGROUND AND SUMMARY

The invention relates to a spark-ignited reciprocating-piston internal-combustion engine with a pre-chamber ignition system having the features from the preamble of claim 1.

With respect to the technical environment, attention is drawn to, for instance, German published application DE 10 2014 111 897 A1. From this publication, an ignition device is known for igniting fuel/air mixtures in a combustion chamber of an internal-combustion engine by means of a corona discharge, with an ignition electrode, with an outer conductor surrounding the ignition electrode, which has a front end and a rear end, and with an electrical insulator arranged between the ignition electrode and the outer conductor, from which at least one tip of the ignition electrode protrudes. The at least one tip of the ignition electrode is situated in a space which is shielded by a cap assigned to the insulator, the cap having an inside facing toward the insulator and an outside facing away from the insulator and also one or more holes through which the shielded space is in communication with a space situated on the outside of the cap, the combustion chamber.

Furthermore, a spark plug for igniting a combustible gas mixture in an internal-combustion engine is known from the international patent application having international publication number WO 2008/031482 A2, comprising:

an ignition electrode,
an electrical supply line to which the ignition electrode is coupled,
an insulator body through which the supply line is passed,
a housing head which is seated in sealing manner on the insulator body and an external thread for screwing into an internal-combustion engine,
a tubular housing which is fastened to the housing head, surrounds the insulator body, and bears a hexagon,
the tubular housing surrounding an insulator-body mounting which has been welded to the housing head via a weld seam and presses the insulator body against the housing head with an initial tension.

With respect to the further technical environment, attention is drawn furthermore to German published application DE 10 2016 120 984 A1. A pre-chamber spark plug for a gas-powered internal-combustion engine and a method for production thereof are known from this published application.

Furthermore, a spark plug is known from German patent application DE 10 2016 206 992 A1. This spark plug is, in particular, a pre-chamber spark plug with a housing, with an ignition electrode and with a ground electrode, the ignition electrode being capable of having an electrical voltage applied to it via a supply line, and the supply line extending at least partially within an insulator, at least one discharge region of the housing having been produced from a material having a thermal conductivity of over 150 W/(m*K).

A spark-ignited reciprocating-piston internal-combustion engine with a pre-chamber ignition system is known from the as yet unpublished German patent application having official file reference DE 10 2020 105 924.8, which is the starting-point of the present invention. The pre-chamber ignition system is arranged in the cylinder head of the reciprocating-piston internal-combustion engine, and an ignition device with an ignition electrode is arranged in the pre-chamber ignition system and protrudes into the cavity of the pre-chamber ignition system. The cavity is covered with a cover in relation to the combustion chamber of the reciprocating-piston internal-combustion engine, the cover exhibiting several apertures which connect the cavity and the combustion chamber to one another in gas-conducting manner. Furthermore, a metallic cross-member with at least one second aperture is arranged in the cavity, in the region of the ignition electrode, with the ignition electrode protruding into the second aperture.

In the case of an ignition device screw-coupled within the pre-chamber ignition system, with an ignition electrode, ordinarily the ignition electrode ignites relative to a ground electrode which is fixed with respect to the pre-chamber. In standard combustion processes with a spark plug, this ground electrode is represented, for example, in the form of a hook electrode. This ground electrode has been produced from a single metallic material.

The housing of a pre-chamber ignition system is often made of a highly thermally conductive material such as, for example, copper (Cu) or a copper alloy, and the ground electrode is made of a temperature-resistant or high-temperature-resistant metallic material, it being possible for the housing and the ground electrode to have different coefficients of thermal expansion. In the case of relatively high loads of an internal-combustion engine, this has the disadvantage that the contact between the ground electrode, by reason of the lower thermal conductance, and the housing of the pre-chamber ignition system, having a higher thermal conductance, is distinctly weaker, and as a result the dissipation of heat from the ground electrode to the cylinder head via the housing of the pre-chamber ignition system is greatly reduced. This, in turn, has the disadvantage that the ground electrode suffers thermal wear or damage, or that ignitions by incandescence may occur disadvantageously on the ground electrode.

An object of the present invention is to demonstrate a measure in order to avoid the aforementioned disadvantages.

This object is achieved by the features in accordance with the independent claims.

Advantageous further developments of the invention are described in the dependent claims.

In accordance with the invention, a functional separation of the cross-member, which undertakes the task of the ground electrode, is to be effected via the combination of two different materials.

The region of the cross-member, the contact region of the cross-member, that is fitted directly into the housing of the pre-chamber ignition system is to be produced in the same material as the housing of the pre-chamber ignition system itself. Only the part of the of the cross-member, the ground electrode in the pre-chamber ignition system, is made of a special electrode material. As a result, there is an ideal dissipation of heat, without formation of gaps, in the region of the joints of the cross-member into the housing of the pre-chamber ignition system.

Certain configurations in concrete terms the necessary requirements as regards the contact region of the cross-member.

Certain configurations express in concrete terms the necessary requirements as regards the central region of the cross-member.

In certain configurations, the central region of the cross-member serves as ground electrode.

In certain configurations, the central region and the contact region of the cross-member have been connected to one another by welding, in particular by friction welding, is a particularly preferred embodiment variant which is capable of being produced inexpensively and easily. A prerequisite in this case, however, is that the materials of the central region and of the contact region are capable of being connected to one another by friction welding.

In certain configurations, the contact region and the housing have been connected to one another by force closure and/or positive closure and/or material closure, is likewise a preferred embodiment.

BRIEF DESCRIPTION OF THE DRAWINGS

The invention is elucidated in more detail in the following in a single FIGURE with reference to an embodiment.

FIG. 1 shows a top view of a section through a pre-chamber ignition system according to the invention.

DETAILED DESCRIPTION OF THE DRAWINGS

FIG. 1 shows a top view of a section through a pre-chamber ignition system 1 according to the depicted embodiment. The pre-chamber ignition system 1 has been provided for a spark-ignited reciprocating-piston internal-combustion engine. A housing 1' of the pre-chamber ignition system 1 is arranged in a cylinder head 2 of the reciprocating-piston internal-combustion engine and consists of a metal having good thermal conductivity, such as copper or a copper alloy. In the present case, the pre-chamber ignition system 1 has been screwed into the cylinder head 2. It is also possible for the pre-chamber ignition system 1 and the cylinder head 2 to be wedged, welded or soldered together.

An ignition device 3—for instance, a spark plug with an ignition electrode 3'—has been inserted into the pre-chamber ignition system 1 from a side facing away from a combustion chamber 6 of the reciprocating-piston internal-combustion engine. Here too, a screw coupling which is not represented is again present. A corona ignition device or other ignition source is also possible. The ignition device 3 protrudes into a cavity 4 of the pre-chamber ignition system 1.

On the side facing away from the ignition device 3, the cavity 4 is covered with a cover 5 in relation to a combustion chamber 6 of the reciprocating-piston internal-combustion engine. The cover 5 exhibits at least one first aperture 7 which connects the cavity 4 and the combustion chamber 6 to one another in gas-conducting manner. In the present embodiment, two apertures 7 are discernible, only one of which is numbered. The number, size and position of the apertures 7 may vary from pre-chamber ignition system 1 to pre-chamber ignition system 1.

Furthermore, a metallic cross-member 8 with at least one second aperture 9 is arranged in the cavity 4 in the region of the ignition electrode 3'. The ignition electrode 3' protrudes into the region of the second aperture 9. The cross-member 8 consequently subdivides the cavity 4 into a residual-gas chamber, not numbered, and a fresh-gas chamber, likewise not numbered. The residual-gas chamber extends between the ignition device 3 and the cross-member 8, and the fresh-gas chamber extends between the cross-member 8 and the cover 5.

The cross-member 8 advantageously serves as ground electrode for the ignition electrode 3' and consequently performs the dual function of ground electrode and "space-divider".

In accordance with the present disclosure, the metallic cross-member 8 is made of a first metallic material in a central region 10, and of a second metallic material in a region 11 of contact with the housing 1'. The cross-member 8 in the contact region 11 is preferentially made of a thermally conductive metallic material; the cross-member 8 in the contact region 11 is particularly preferably made of the same metallic material as the housing 1'. This means that the contact regions 11, just like the housing 1', preferentially consist of copper or a copper alloy. A mechanical connection between the contact region 11 and the housing 1' is preferably effected by force closure and/or positive closure and/or material closure; these are connection technologies that are sufficiently well-known to a person skilled in the art.

In comparison with the contact regions 11, the cross-member 8 consists in its central region 10 of a high-temperature-resistant metallic material such as, for example, a tungsten alloy or a tungsten/copper alloy or a nickel alloy or an Inconel material. This is particularly advantageous, since the cross-member 8 acts in its central region 10 as a ground electrode for the ignition electrode 3'. The central region 10 and the contact regions 11 are particularly preferably connected to one another by welding, in particular by friction welding. These connection technologies are also sufficiently well-known to a person skilled in the art.

In summary, the following may be stated:

A pre-chamber ignition is to be effected via, for instance, a CuCr1Zr (copper/chromium/zirconium alloy) housing 1' of the pre-chamber ignition system 1. The contact regions 11 of the cross-member 8 are preferentially to be pressed into the housing 1' of the pre-chamber ignition system 1, and, for instance, are also to have been constructed from CuCr1Zr. The actual ground electrode, constituted by the central region 10, is then located between the two CuCr1Zr contact regions 11, preferentially connected to the contact regions 11 by friction welding. This central region 10 then preferentially consists of a tungsten/copper sintered combination (W/Cu) or entirely of tungsten (W) or nickel (Ni) or Inconel (Inconel is a trade name of the company Special Metals Corporation for highly corrosion-resistant nickel-based alloys; these nickel-based alloys are utilized, above all, for high-temperature applications) or of another material, suitable for the application, that is resistant to high temperature, has high spark-out resistance and high thermal conductivity. In other words, the ground electrode then consists of several parts connected to one another by friction welding.

In conclusion, it should also be stated that the configuration of the pre-chamber ignition system 1 in accordance with the present disclosure can be employed both for passive pre-chamber ignition systems, as represented here, and for active pre-chamber ignition systems having their own introduction of fuel into the cavity 4.

In a further embodiment, the housing 1' may also have been formed from the cylinder-head material—that is to say, the housing 1' is then a bore in the cylinder head 2.

LIST OF REFERENCE SYMBOLS 1. pre-chamber ignition system
1' housing
2. cylinder head
3. ignition device
3' ignition electrode
4. cavity
5 cover
6. combustion chamber
7. first aperture
8. cross-member
9. second aperture
10. central region
11. contact region

The invention claimed is:

1. A spark-ignited reciprocating-piston internal-combustion engine with a pre-chamber ignition system which is arranged in a cylinder head of the reciprocating-piston internal-combustion engine, the reciprocating-piston internal-combustion engine comprising:
an ignition device with an ignition electrode arranged in a housing and protruding into a cavity of the pre-chamber ignition system, wherein
the housing comprises a metallic material including copper or a copper alloy, wherein
the cavity is covered with a cover from a combustion chamber of the reciprocating-piston internal-combustion engine, wherein
the cover includes at least one first aperture which connects the cavity and the combustion chamber to one another in gas-conducting manner, wherein
a metallic cross-member with at least one second aperture, which connects opposing sides of the housing, is arranged in the cavity in a region of the ignition electrode, wherein
the metallic cross-member includes a first metallic material in a central region of contact with the housing and a second metallic material in a region of contact with the housing, wherein the central region and the contact region are connected with a friction weld, and wherein
the second metallic material is a same metallic material including copper or a copper alloy as the metallic material including copper or a copper alloy of the housing such that the second metallic material and the housing have a same thermal conductance to thereby prevent formation of gaps in the region of contact between the second metallic material and the housing.

2. The reciprocating-piston internal-combustion engine according to claim 1, wherein
the cross-member in the contact region includes a thermally conductive metallic material.

3. The reciprocating-piston internal-combustion engine according to claim 1, wherein
the cross-member includes a high-temperature-resistant metallic material in the central region.

4. The reciprocating-piston internal-combustion engine according to claim 1, wherein
the cross-member includes at least one of a tungsten alloy, a tungsten/copper alloy, a nickel alloy, or an Inconel material in the central region.

5. The reciprocating-piston internal-combustion engine according to claim 1, wherein
the cross-member includes a ground electrode for the ignition electrode in the central region.

6. The reciprocating-piston internal-combustion engine according to claim 1, wherein
the contact region and the housing are connected by force closure.

7. The reciprocating-piston internal-combustion engine according to claim 1, wherein
the contract region and the housing are connected via positive closure.

8. The reciprocating-piston internal-combustion engine according to claim 1, wherein
the contract region and the housing are connected via material closure.

9. A spark-ignited reciprocating-piston internal-combustion engine, comprising:
a pre-chamber ignition system;
a cylinder head, wherein the pre-chamber ignition system is arranged within the cylinder head; and
an ignition electrode configured for placement in a housing of the engine and for protruding into a cavity of a pre-chamber ignition system of the engine, wherein
the pre-chamber ignition system comprises a pre-chamber ignition system housing comprising a metallic material including copper or a copper alloy, wherein
the cavity is covered with a cover from a combustion chamber of the reciprocating-piston internal-combustion engine, wherein
the cover includes at least one first aperture which connects the cavity and the combustion chamber to one another in gas-conducting manner, wherein
a metallic cross-member with at least one second aperture, which connects opposing sides of the pre-chamber ignition system housing, is arranged in the cavity in a region of the ignition electrode, wherein
the metallic cross-member includes a first metallic material in a central region of contact with the pre-chamber ignition system housing and a second metallic material in a region of contact with the pre-chamber ignition system housing, wherein the central region and the contact region are connected with a friction weld, and wherein
the second metallic material is a same metallic material including copper or a copper alloy as the metallic material including copper or a copper alloy of the pre-chamber ignition system housing such that the second metallic material and the housing have a same thermal conductance to thereby prevent formation of gaps in the region of contact between the second metallic material and the housing.

10. The reciprocating-piston internal-combustion engine according to claim 9, wherein
the cross-member in the contact region includes a thermally conductive metallic material.

11. The reciprocating-piston internal-combustion engine according to claim 9, wherein
the cross-member includes a high-temperature-resistant metallic material in the central region.

12. The reciprocating-piston internal-combustion engine according to claim 9, wherein
the cross-member includes at least one of a tungsten alloy, a tungsten/copper alloy, a nickel alloy, and an Inconel material in the central region.

13. The reciprocating-piston internal-combustion engine according to claim 9, wherein
the cross-member includes a ground electrode for the ignition electrode in the central region.

14. The reciprocating-piston internal-combustion engine according to claim 9, wherein
the contact region and the pre-chamber ignition system housing are connected by force closure.

15. The reciprocating-piston internal-combustion engine according to claim 9, wherein
the contract region and the pre-chamber ignition system housing are connected via positive closure.

16. The reciprocating-piston internal-combustion engine according to claim 9, wherein
the contract region and the pre-chamber ignition system housing are connected via material closure.

17. The reciprocating-piston internal-combustion engine according to claim 9, wherein
the first metallic material in the central region has a lower thermal conductivity than the second metallic material in the region of contact with the pre-chamber ignition system housing.

18. The reciprocating-piston internal-combustion engine according to claim 1, wherein
the first metallic material in the central region has a lower thermal conductivity than the second metallic material in the region of contact with the housing.

* * * * *